(12) United States Patent
Morin et al.

(10) Patent No.: US 12,113,711 B2
(45) Date of Patent: *Oct. 8, 2024

(54) APPLICATION-BASED TRAFFIC CONTROL IN MULTIPATH NETWORKS

(71) Applicant: NOKIA SOLUTIONS AND NETWORKS OY, Espoo (FI)

(72) Inventors: Steve Morin, Ottawa (CA); Roger Bainbridge, Ottawa (CA); Weerapong Kritpiphat, Ottawa (CA); John Fischer, Ottawa (CA)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 34 days.

This patent is subject to a terminal disclaimer.

(21) Appl. No.: 17/669,513

(22) Filed: Feb. 11, 2022

(65) Prior Publication Data
US 2022/0166724 A1 May 26, 2022

Related U.S. Application Data

(63) Continuation of application No. 16/020,203, filed on Jun. 27, 2018, now Pat. No. 11,283,721.

(51) Int. Cl.
*H04L 47/193* (2022.01)
*H04L 45/24* (2022.01)
(Continued)

(52) U.S. Cl.
CPC ............ *H04L 47/193* (2013.01); *H04L 45/24* (2013.01); *H04L 45/306* (2013.01); *H04L 47/62* (2013.01); *H04L 69/22* (2013.01)

(58) Field of Classification Search
CPC ....... H04L 47/193; H04L 47/62; H04L 45/24; H04L 45/306; H04L 69/22
(Continued)

(56) References Cited

U.S. PATENT DOCUMENTS

2013/0095806 A1  4/2013  Salkintzis
2016/0380884 A1* 12/2016  Sarikaya ................. H04W 8/08
                                              370/389
(Continued)

OTHER PUBLICATIONS

Broadband Forum, "Hybrid Access Broadband Network Architecture," Broadband Forum Technical Report, TR-348, Issue 1, Jul. 2016, 49 pages.
(Continued)

*Primary Examiner* — Faisal Choudhury
(74) *Attorney, Agent, or Firm* — Tong, Rea, Bentley & Kim, LLC

(57) ABSTRACT

Various example embodiments for supporting application-based traffic control in a multipath network are presented herein. Various example embodiments for supporting application-based traffic control in a multipath network may be configured to support application-based traffic steering, application-based traffic blocking, or the like, as well as various combinations thereof. Various example embodiments for supporting application-based traffic control in a multipath network may be configured to support application-based traffic control in various types of multipath networks, such as multipath networks combining wireline and wireless access technologies between an end-user customer premises and a network gateway (e.g., between a hybrid-access customer premises equipment (HCPE) and a hybrid-access gateway (HAG), in a hybrid-access communication network (e.g., based on a Broadband Forum TR-348 specification), that are in communication based on a multipath communication capability), multipath networks combining multiple wireless access technologies (e.g., cellular, WiFi, or the like) between an end user mobile device and a network gateway, or the like.

18 Claims, 6 Drawing Sheets

(51) Int. Cl.
   *H04L 45/302* (2022.01)
   *H04L 47/62* (2022.01)
   *H04L 69/22* (2022.01)

(58) Field of Classification Search
   USPC .......................................................... 370/392
   See application file for complete search history.

(56) References Cited

U.S. PATENT DOCUMENTS

| | | | |
|---|---|---|---|
| 2017/0034283 A1 | 2/2017 | Moharana | |
| 2017/0041836 A1* | 2/2017 | Huang | H04L 41/046 |
| 2017/0302549 A1 | 10/2017 | Han | |
| 2017/0311209 A1 | 10/2017 | Begen | |
| 2018/0212883 A1 | 7/2018 | Wei | |
| 2019/0182363 A1* | 6/2019 | Bonaventure | H04L 67/01 |
| 2019/0335520 A1* | 10/2019 | Dion | H04L 69/14 |
| 2020/0396155 A1* | 12/2020 | Molla | H04L 12/4641 |
| 2022/0103465 A1* | 3/2022 | Zhu | H04L 1/187 |

OTHER PUBLICATIONS

Dion, G., U.S. Appl. No. 15/705,379, filed Sep. 15, 2017, 34 pages.

* cited by examiner

APPLICATION-BASED TRAFFIC CONTROL IN MULTIPATH NETWORKS

CROSS REFERENCE TO RELATED APPLICATIONS

This application is a continuation of U.S. patent application Ser. No. 16/020,203, filed on Jun. 27, 2018, entitled APPLICATION-BASED TRAFFIC CONTROL IN MULTIPATH NETWORKS, which is hereby incorporated herein by reference in its entirety.

TECHNICAL FIELD

Various example embodiments relate generally to communication networks and, more particularly but not exclusively, to supporting application-based traffic control in multipath networks.

BACKGROUND

Multipath communication techniques may be utilized in various types of communication networks.

SUMMARY

Various example embodiments relate generally to application-based traffic control in a multipath network.

In at least some example embodiments, an apparatus is provided. The apparatus includes at least one processor. The apparatus includes at least one memory including computer program code. The at least one memory and the computer program code are configured to, with the at least one processor, cause the apparatus to at least determine, for a transport layer flow supported using a multipath connection including a set of transport layer subflows, an application indication of traffic of the transport layer flow and control, based on the application indication of the traffic of the transport layer flow, transport of the traffic of the transport layer flow via the multipath connection. In at least some embodiments, the application indication of the traffic of the transport layer flow includes at least one of an indication of an application of the traffic of the transport layer flow or an indication of an application type of traffic of the transport layer flow. In at least some embodiments, the application indication of the traffic of the transport layer flow is determined based on at least one of packet header inspection or deep packet inspection. In at least some embodiments, the application indication of the traffic of the transport layer flow is determined based on at least one of a protocol of the transport layer flow, an application group of the transport layer flow, or a charging group of the transport layer flow. In at least some embodiments, to control transport of the traffic of the transport layer flow via the multipath connection, the at least one memory and the computer program code are configured to, with the at least one processor, cause the apparatus to at least control scheduling of the traffic of the transport layer flow on the set of transport layer subflows of the multipath connection. In at least some embodiments, the scheduling of the traffic of the transport layer flow on the set of transport layer subflows of the multipath connection is based on use of one or more multipath scheduling algorithms. In at least some embodiments, the one or more multipath scheduling algorithms include at least one of a multipath scheduling algorithm based on round trip time, a multipath scheduling algorithm based on cost, or a multipath scheduling algorithm based on round robin scheduling. In at least some embodiments, to control transport of the traffic of the transport layer flow via the multipath connection, the at least one memory and the computer program code are configured to, with the at least one processor, cause the apparatus to at least control the set of transport layer subflows of the multipath connection. In at least some embodiments, to control the set of transport layer subflows of the multipath connection, the at least one memory and the computer program code are configured to, with the at least one processor, cause the apparatus to at least prevent establishment of a new transport layer subflow for the multipath connection. In at least some embodiments, to prevent establishment of the new transport layer subflow for the multipath connection, the at least one memory and the computer program code are configured to, with the at least one processor, cause the apparatus to at least suppress a request, initiated locally at the apparatus, for establishment of the new transport layer subflow for the multipath connection. In at least some embodiments, to prevent establishment of the new transport layer subflow for the multipath connection, the at least one memory and the computer program code are configured to, with the at least one processor, cause the apparatus to at least deny a request, from a remote device associated with the multipath connection, for establishment of the new transport layer subflow for the multipath connection. In at least some embodiments, to control the set of transport layer subflows of the multipath connection, the at least one memory and the computer program code are configured to, with the at least one processor, cause the apparatus to at least initiate termination of an existing transport layer subflow of the multipath connection. In at least some embodiments, to initiate termination of the existing transport layer subflow for the multipath connection, the at least one memory and the computer program code are configured to, with the at least one processor, cause the apparatus to at least initiate, locally at the apparatus, termination of the existing transport layer subflow for the multipath connection where the existing transport layer subflow was established by the apparatus. In at least some embodiments, to initiate termination of the existing transport layer subflow for the multipath connection, the at least one memory and the computer program code are configured to, with the at least one processor, cause the apparatus to at least force, by the apparatus, termination of the existing transport layer subflow for the multipath connection where the existing transport layer subflow was established by a remote device associated with the multipath connection. In at least some embodiments, controlling the set of transport layer subflows of the multipath connection is based on use of one or more multipath path selection algorithms. In at least some embodiments, the one or more multipath path selection algorithms include at least one of a multipath path selection algorithm based on round trip time or a multipath path selection algorithm based on cost. In at least some embodiments, the apparatus is associated with a set of access networks configured to support a set of access links, and, to control transport of the traffic of the transport layer flow via the multipath connection, the at least one memory and the computer program code are configured to, with the at least one processor, cause the apparatus to at least select one of the access links of one of the access networks for the traffic of the transport layer flow. In at least some embodiments, the apparatus includes a Hybrid Access Gateway (HAG) configured to support the multipath connection with a Hybrid Customer Premises Equipment (HCPE). In at least some embodiments, the apparatus includes a network device configured to support the multipath connection with a customer device.

In at least some example embodiments, a non-transitory computer readable medium is provided. The non-transitory computer-readable medium includes program instructions for causing an apparatus to at least determine, for a transport layer flow supported using a multipath connection including a set of transport layer subflows, an application indication of traffic of the transport layer flow and control, based on the application indication of the traffic of the transport layer flow, transport of the traffic of the transport layer flow via the multipath connection. In at least some embodiments, the application indication of the traffic of the transport layer flow includes at least one of an indication of an application of the traffic of the transport layer flow or an indication of an application type of traffic of the transport layer flow. In at least some embodiments, the application indication of the traffic of the transport layer flow is determined based on at least one of packet header inspection or deep packet inspection. In at least some embodiments, the application indication of the traffic of the transport layer flow is determined based on at least one of a protocol of the transport layer flow, an application group of the transport layer flow, or a charging group of the transport layer flow. In at least some embodiments, to control transport of the traffic of the transport layer flow via the multipath connection, the non-transitory computer-readable medium includes program instructions for causing the apparatus to at least control scheduling of the traffic of the transport layer flow on the set of transport layer subflows of the multipath connection. In at least some embodiments, the scheduling of the traffic of the transport layer flow on the set of transport layer subflows of the multipath connection is based on use of one or more multipath scheduling algorithms. In at least some embodiments, the one or more multipath scheduling algorithms include at least one of a multipath scheduling algorithm based on round trip time, a multipath scheduling algorithm based on cost, or a multipath scheduling algorithm based on round robin scheduling. In at least some embodiments, to control transport of the traffic of the transport layer flow via the multipath connection, the non-transitory computer-readable medium includes program instructions for causing the apparatus to at least control the set of transport layer subflows of the multipath connection. In at least some embodiments, to control the set of transport layer subflows of the multipath connection, the non-transitory computer-readable medium includes program instructions for causing the apparatus to at least prevent establishment of a new transport layer subflow for the multipath connection. In at least some embodiments, to prevent establishment of the new transport layer subflow for the multipath connection, the non-transitory computer-readable medium includes program instructions for causing the apparatus to at least suppress a request, initiated locally at the apparatus, for establishment of the new transport layer subflow for the multipath connection. In at least some embodiments, to prevent establishment of the new transport layer subflow for the multipath connection, the non-transitory computer-readable medium includes program instructions for causing the apparatus to at least deny a request, from a remote device associated with the multipath connection, for establishment of the new transport layer subflow for the multipath connection. In at least some embodiments, to control the set of transport layer subflows of the multipath connection, the non-transitory computer-readable medium includes program instructions for causing the apparatus to at least initiate termination of an existing transport layer subflow of the multipath connection. In at least some embodiments, to initiate termination of the existing transport layer subflow for the multipath connection, the non-transitory computer-readable medium includes program instructions for causing the apparatus to at least initiate, locally at the apparatus, termination of the existing transport layer subflow for the multipath connection where the existing transport layer subflow was established by the apparatus. In at least some embodiments, to initiate termination of the existing transport layer subflow for the multipath connection, the non-transitory computer-readable medium includes program instructions for causing the apparatus to at least force, by the apparatus, termination of the existing transport layer subflow for the multipath connection where the existing transport layer subflow was established by a remote device associated with the multipath connection. In at least some embodiments, controlling the set of transport layer subflows of the multipath connection is based on use of one or more multipath path selection algorithms. In at least some embodiments, the one or more multipath path selection algorithms include at least one of a multipath path selection algorithm based on round trip time or a multipath path selection algorithm based on cost. In at least some embodiments, the apparatus is associated with a set of access networks configured to support a set of access links, and, to control transport of the traffic of the transport layer flow via the multipath connection, the non-transitory computer-readable medium includes program instructions for causing the apparatus to at least select one of the access links of one of the access networks for the traffic of the transport layer flow. In at least some embodiments, the apparatus includes a Hybrid Access Gateway (HAG) configured to support the multipath connection with a Hybrid Customer Premises Equipment (HCPE). In at least some embodiments, the apparatus includes a network device configured to support the multipath connection with a customer device.

In at least some example embodiments, a method is provided. The method includes determining, for a transport layer flow supported using a multipath connection including a set of transport layer subflows, an application indication of traffic of the transport layer flow and controlling, based on the application indication of the traffic of the transport layer flow, transport of the traffic of the transport layer flow via the multipath connection. In at least some embodiments, the application indication of the traffic of the transport layer flow includes at least one of an indication of an application of the traffic of the transport layer flow or an indication of an application type of traffic of the transport layer flow. In at least some embodiments, the application indication of the traffic of the transport layer flow is determined based on at least one of packet header inspection or deep packet inspection. In at least some embodiments, the application indication of the traffic of the transport layer flow is determined based on at least one of a protocol of the transport layer flow, an application group of the transport layer flow, or a charging group of the transport layer flow. In at least some embodiments, controlling transport of the traffic of the transport layer flow via the multipath connection includes controlling scheduling of the traffic of the transport layer flow on the set of transport layer subflows of the multipath connection. In at least some embodiments, the scheduling of the traffic of the transport layer flow on the set of transport layer subflows of the multipath connection is based on use of one or more multipath scheduling algorithms. In at least some embodiments, the one or more multipath scheduling algorithms include at least one of a multipath scheduling algorithm based on round trip time, a multipath scheduling algorithm based on cost, or a multipath scheduling algorithm based on round robin scheduling. In at least some embodiments, controlling transport of the traffic of the transport layer flow via the multipath connection includes controlling the set of transport layer subflows of the multipath connection. In at least some embodiments, controlling the set of transport layer subflows of the multipath connection includes preventing establishment of a new transport layer subflow for the multipath connection. In at least some embodiments, preventing establishment of the new transport layer subflow for the multipath connection includes suppressing a request, initiated locally, for establishment of the new transport layer subflow for the multipath connection. In at least some embodiments, preventing establishment of the new transport layer subflow for the multipath connection includes denying a request, from a remote device associated with the multipath connection, for establishment of the new transport layer subflow for the multipath connection. In at least some embodiments, controlling the set of transport layer subflows of the multipath connection includes initiating termination of an existing transport layer subflow of the multipath connection. In at least some embodiments, initiating termination of the existing transport layer subflow for the multipath connection includes initiating, locally, termination of the existing transport layer subflow for the multipath connection where the existing transport layer subflow was established locally. In at least some embodiments, initiating termination of the existing transport layer subflow for the multipath connection includes forcing termination of the existing transport layer subflow for the multipath connection where the existing transport layer subflow was established by a remote device associated with the multipath connection. In at least some embodiments, controlling the set of transport layer subflows of the multipath connection is based on use of one or more multipath path selection algorithms. In at least some embodiments, the one or more multipath path selection algorithms include at least one of a multipath path selection algorithm based on round trip time or a multipath path selection algorithm based on cost. In at least some embodiments, controlling transport of the traffic of the transport layer flow via the multipath connection includes selecting, from a set of access links associated with a set of access networks, one of the access links of one of the access networks for the traffic of the transport layer flow. In at least some embodiments, the method is provided by an apparatus that includes a Hybrid Access Gateway (HAG) configured to support the multipath connection with a Hybrid Customer Premises Equipment (HCPE). In at least some embodiments, the method is provided by an apparatus that includes a network device configured to support the multipath connection with a customer device.

In at least some example embodiments, an apparatus is provided. The apparatus includes means for determining, for a transport layer flow supported using a multipath connection including a set of transport layer subflows, an application indication of traffic of the transport layer flow and means for controlling, based on the application indication of the traffic of the transport layer flow, transport of the traffic of the transport layer flow via the multipath connection. In at least some embodiments, the application indication of the traffic of the transport layer flow includes at least one of an indication of an application of the traffic of the transport layer flow or an indication of an application type of traffic of the transport layer flow. In at least some embodiments, the application indication of the traffic of the transport layer flow is determined based on at least one of packet header inspection or deep packet inspection. In at least some embodiments, the application indication of the traffic of the transport layer flow is determined based on at least one of a protocol of the transport layer flow, an application group of the transport layer flow, or a charging group of the transport layer flow. In at least some embodiments, the means for controlling transport of the traffic of the transport layer flow via the multipath connection includes means for controlling scheduling of the traffic of the transport layer flow on the set of transport layer subflows of the multipath connection. In at least some embodiments, the scheduling of the traffic of the transport layer flow on the set of transport layer subflows of the multipath connection is based on use of one or more multipath scheduling algorithms. In at least some embodiments, the one or more multipath scheduling algorithms include at least one of a multipath scheduling algorithm based on round trip time, a multipath scheduling algorithm based on cost, or a multipath scheduling algorithm based on round robin scheduling. In at least some embodiments, the means for controlling transport of the traffic of the transport layer flow via the multipath connection includes means for controlling the set of transport layer subflows of the multipath connection. In at least some embodiments, the means for controlling the set of transport layer subflows of the multipath connection includes means for preventing establishment of a new transport layer subflow for the multipath connection. In at least some embodiments, the means for preventing establishment of the new transport layer subflow for the multipath connection includes means for suppressing a request, initiated locally at the apparatus, for establishment of the new transport layer subflow for the multipath connection. In at least some embodiments, the means for preventing establishment of the new transport layer subflow for the multipath connection includes means for denying a request, from a remote device associated with the multipath connection, for establishment of the new transport layer subflow for the multipath connection. In at least some embodiments, the means for controlling the set of transport layer subflows of the multipath connection includes means for initiating termination of an existing transport layer subflow of the multipath connection. In at least some embodiments, the means for initiating termination of the existing transport layer subflow for the multipath connection includes means for initiating, locally at the apparatus, termination of the existing transport layer subflow for the multipath connection where the existing transport layer subflow was established by the apparatus. In at least some embodiments, the means for initiating termination of the existing transport layer subflow for the multipath connection includes means for forcing, by the apparatus, termination of the existing transport layer subflow for the multipath connection where the existing transport layer subflow was established by a remote device associated with the multipath connection. In at least some embodiments, controlling the set of transport layer subflows of the multipath connection is based on use of one or more multipath path selection algorithms. In at least some embodiments, the one or more multipath path selection algorithms include at least one of a multipath path selection algorithm based on round trip time or a multipath path selection algorithm based on cost. In at least some embodiments, the apparatus is associated with a set of access networks configured to support a set of access links, and, the means for controlling transport of the traffic of the transport layer flow via the multipath connection includes means for selecting one of the access links of one of the access networks for the traffic of the transport layer flow. In at least some embodiments, the apparatus includes a Hybrid Access Gateway (HAG) configured to support the multipath connection with a Hybrid Customer Premises Equipment (HCPE). In at least some embodiments, the apparatus includes a network device configured to support the multipath connection with a customer device.

In at least some example embodiments, an apparatus is provided. The apparatus includes at least one processor. The apparatus includes at least one memory including computer program code. The at least one memory and the computer program code are configured to, with the at least one processor, cause the apparatus to at least determine, for a transport layer flow supported using a multipath connection including a set of transport layer subflows, an application indication of traffic of the transport layer flow and control, based on the application indication of the traffic of the transport layer flow, scheduling of the traffic of the transport layer flow on the set of transport layer subflows of the multipath connection.

In at least some example embodiments, a non-transitory computer readable medium is provided. The non-transitory computer-readable medium includes program instructions for causing an apparatus to at least determine, for a transport layer flow supported using a multipath connection including a set of transport layer subflows, an application indication of traffic of the transport layer flow and control, based on the application indication of the traffic of the transport layer flow, scheduling of the traffic of the transport layer flow on the set of transport layer subflows of the multipath connection.

In at least some example embodiments, a method is provided. The method includes determining, for a transport layer flow supported using a multipath connection including a set of transport layer subflows, an application indication of traffic of the transport layer flow and controlling, based on the application indication of the traffic of the transport layer flow, scheduling of the traffic of the transport layer flow on the set of transport layer subflows of the multipath connection.

In at least some example embodiments, an apparatus is provided. The apparatus includes means for determining, for a transport layer flow supported using a multipath connection including a set of transport layer subflows, an application indication of traffic of the transport layer flow and means for controlling, based on the application indication of the traffic of the transport layer flow, scheduling of the traffic of the transport layer flow on the set of transport layer subflows of the multipath connection.

In at least some example embodiments, an apparatus is provided. The apparatus includes at least one processor. The apparatus includes at least one memory including computer program code. The at least one memory and the computer program code are configured to, with the at least one processor, cause the apparatus to at least determine, for a transport layer flow supported using a multipath connection including a set of transport layer subflows, an application indication of traffic of the transport layer flow and control, based on the application indication of the traffic of the transport layer flow, transport of the traffic of the transport layer flow via the multipath connection wherein the control includes at least one of preventing establishment of a new transport layer subflow for the multipath connection or initiating termination of an existing transport layer subflow of the multipath connection.

In at least some example embodiments, a non-transitory computer readable medium is provided. The non-transitory computer-readable medium includes program instructions for causing an apparatus to at least determine, for a transport layer flow supported using a multipath connection including a set of transport layer subflows, an application indication of traffic of the transport layer flow and control, based on the application indication of the traffic of the transport layer flow, transport of the traffic of the transport layer flow via the multipath connection wherein the control includes at least one of preventing establishment of a new transport layer subflow for the multipath connection or initiating termination of an existing transport layer subflow of the multipath connection.

In at least some example embodiments, a method is provided. The method includes determining, for a transport layer flow supported using a multipath connection including a set of transport layer subflows, an application indication of traffic of the transport layer flow and controlling, based on the application indication of the traffic of the transport layer flow, transport of the traffic of the transport layer flow via the multipath connection wherein the controlling includes at least one of preventing establishment of a new transport layer subflow for the multipath connection or initiating termination of an existing transport layer subflow of the multipath connection.

In at least some example embodiments, an apparatus is provided. The apparatus includes means for determining, for a transport layer flow supported using a multipath connection including a set of transport layer subflows, an application indication of traffic of the transport layer flow and means for controlling, based on the application indication of the traffic of the transport layer flow, transport of the traffic of the transport layer flow via the multipath connection wherein the means for controlling includes at least one of means for preventing establishment of a new transport layer subflow for the multipath connection or means for initiating termination of an existing transport layer subflow of the multipath connection.

BRIEF DESCRIPTION OF THE DRAWINGS

The teachings herein can be readily understood by considering the following detailed description in conjunction with the accompanying drawings, in which.

DETAILED DESCRIPTION

Figure 1:
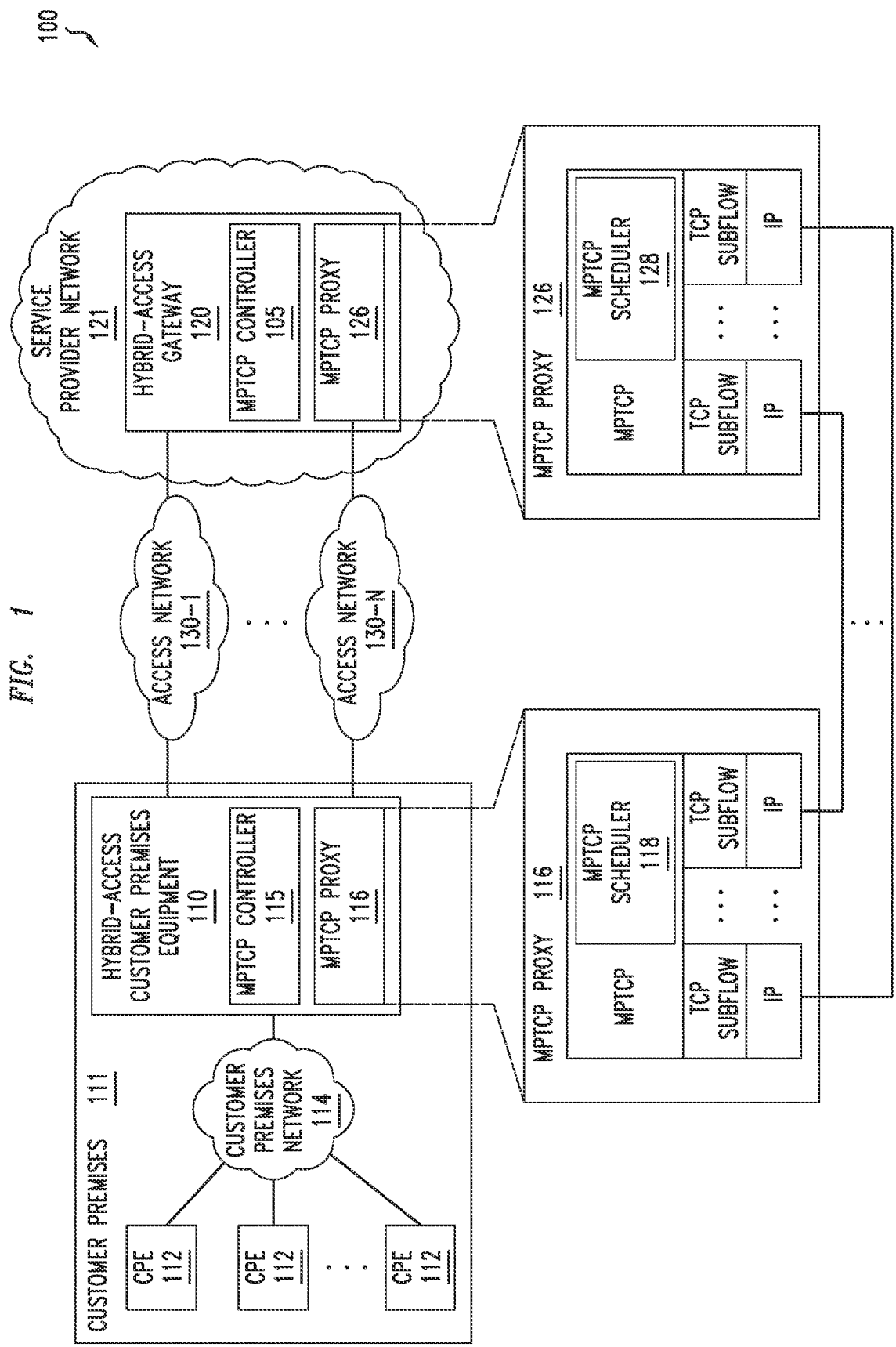
FIG. 1 depicts an example embodiment of a hybrid access communication system configured to support application-based traffic control in a multipath network supporting multipath communications between a hybrid access gateway (HAG) and a hybrid customer premises equipment (HCPE)

Various example embodiments for supporting application-based traffic control in a multipath network are presented herein. Various example embodiments for supporting application-based traffic control in a multipath network may be configured to support application-based traffic control for a transport layer flow that is transported using a set of transport layer subflows providing a multipath connection for the transport layer flow. Various example embodiments for supporting application-based traffic control for a transport layer flow in a multipath network may be configured to support application-based traffic steering for the transport layer flow, application-based traffic blocking for the transport layer flow, or the like, as well as various combinations thereof. Various example embodiments for supporting application-based traffic control for a transport layer flow in a multipath network may be configured to support application-based traffic steering that is based on use of multipath scheduling algorithms to schedule packets of the transport layer flow for transmission on transport layer subflows providing the multipath connection for the transport layer flow (e.g., preferring use of transport layer subflows based on round-trip-time or cost, using round-robin scheduling, or the like, as well as various combinations thereof). Various example embodiments for supporting application-based traffic control for a transport layer flow in a multipath network may be configured to support application-based traffic blocking that is based on use of multipath path selection algorithms to control selection and establishment of transport layer subflows to be used to provide the multipath connection for the transport layer flow (e.g., preventing establishment of transport layer subflows that would otherwise be established, terminating transport layer subflows that were previously established but which should not be used, or the like, as well as various combinations thereof). Various example embodiments for supporting application-based traffic control in a multipath network may be configured to support application-based traffic control in various types of multipath networks, such as multipath networks based on various multipath technologies (e.g., Multipath-Transmission Control Protocol (MPTCP) or the like), multipath networks combining various types of access network technologies (e.g., combining multiple types of wireline access networks, combining multiple types of wireless access networks, combining wireline and wireless access networks, or the like, as well as various combinations thereof), multipath networks supporting multipath connections between various types of multipath connection endpoints (e.g., between a hybrid-access customer premises equipment (HCPE) and a hybrid-access gateway (HAG) in a hybrid-access communication network (e.g., based on a Broadband Forum TR-348 specification), between an end user mobile device and a network gateway, or the like), or the like, as well as various combinations thereof. It will be appreciated that these and various other example embodiments and advantages or potential advantages for supporting application-based traffic control in a multipath network may be further understood by way of reference to the various figures, which are discussed further below.

FIG. 1 depicts an example embodiment of a hybrid access communication system configured to support application-based traffic control in a multipath network supporting multipath communications between a hybrid access gateway (HAG) and a hybrid customer premises equipment (HCPE).

The hybrid access communication system 100 includes a hybrid-access customer premises equipment (HCPE) 110 and a hybrid-access gateway (HAG) 120 that are configured to communicate via a set of access networks 130-1-130-N (collectively, access networks 130). The hybrid-access elements of the hybrid access communication system 100 may be configured to support various functions as defined in the Broadband Forum TR-348 specification.

The HCPE 110 is located at a customer premises 111 and is configured to operate as a gateway of the customer premises 111 for a set of customer premises equipments (CPEs) 112 located at the customer premises 111. The HCPE 110 is configured to communicate via each of the access networks 130, for supporting use of multiple access networks 130 to communicate traffic between the HCPE 110 and the HAG 120. The HCPE 110 is configured to communicate with each of the CPEs 112 at the customer premises 111. The HCPE 110 may communicate with the CPEs 112 at customer premises 111 via a customer premises network 114 (e.g., a local area network (LAN) or other type of network supporting suitable local communication capabilities). The CPEs 112 may include various types of end user device which may located at the customer premises 111 (e.g., telephones, computers, smart televisions, gaming systems, Internet-of-Things (IoT) devices, or the like, as well as various combinations thereof).

The HAG 120 is deployed within a service provider network (SPN) 121 and is configured to operate as a gateway of the SPN 121 for the HCPE 110 (as well as for other HCPEs associated with other customer premises, which have been omitted for purposes of clarity). The HAG 120 is configured to communicate via each of the access networks 130, for supporting use of multiple access networks 130 in order to communicate traffic between the HAG 120 and the HCPE 110. The HAG 120 is configured to communicate with various other elements of the SPN 121 as well as any other elements which may be accessible via SPN 121 and any other communication networks reachable via the SPN 121 (e.g., private data networks such as data center networks or enterprise networks, public data networks such as the Internet, or the like, as well as various combinations thereof).

The access networks 130 may include any access networks which may support communication between the HCPE 110 and the HAG 120. The access networks 130 may provide access links between the HCPE 110 and the HAG 120 for supporting transport layer subflows between the HCPE 110 and the HAG 120. The access networks 130 may include one or more wireline access networks, one or more wireless access networks, or the like, as well as various combinations thereof. For example, the access networks 130 may include one or more of a digital subscriber line (DSL) access network, a Data Over Cable Service Interface Specification (DOCSIS) access network, a passive optical network (PON) access network, a cellular access network (e.g., Third Generation (3G) cellular access networks, a Fourth Generation (4G) cellular access network (e.g., a Long Term Evolution (LTE) access network), a Fifth Generation (5G) cellular access network, or the like), a fixed wireless access network, a WiFi access network, a satellite access network, or the like. The access networks 130 may include any other suitable type(s) of wireline or wireless access networks.

The HCPE 110 and the HAG 120 are configured to communicate using the access networks 130 based on a multipath communication capability. The multipath communication capability enables transport of traffic of a transport layer connection using a multipath connection composed of a set of multiple transport layer subflows which may be established via a single access network 130 or multiple access networks 130. The transport layer subflows of the multipath connection may be transport layer connections. The multipath communication capability may be provided using the Multipath Transmission Control Protocol (MPTCP), in which case traffic of a TCP connection is transported using an MPTCP connection between the HAG 120 and the HCPE 110 where the MPTCP connection is composed of multiple TCP subflows between the HAG 120 and the HCPE 110. The TCP subflows of the MPTCP connection may be TCP connections. It is noted that MPTCP may be used in both the downstream direction for transport of TCP flows from HAG 120 to the HCPE 110 (for delivery to the CPEs 112) and the upstream direction for transport of TCP flows (originating from the CPEs 112) from the HCPE 110 to the HAG 120. It is noted that an example of use of an MPTCP connection for the multipath connection between the HAG 120 and the HCPE 110 is depicted in FIG. 1. It is noted that the multipath communication capability may be provided using other multipath communication technologies.

The HCPE 110 and the HAG 120 are configured to support the MPTCP connection using a pair of MPTCP controllers (including an MPTCP controller 115 on HCPE 110 and an MPTCP controller 125 on HAG 120) and a pair of MPTCP proxies (including an MPTCP proxy 116 on the HCPE 110 and an MPTCP proxy 126 on the HAG 120). The MPTCP connection is established between the MPTCP proxy 116 and the MPTCP proxy 126 under the control of the MPTCP controller 115 and the MPTCP controller 125. The MPTCP connection is composed of a set of TCP subflows which may include one or more TCP subflows. The TCP subflows of the MPTCP connection may be provided over one or more of the access networks 130 (e.g., each TCP subflow may be provided over a separate access network 130, one or more TCP subflows may share an access network 130, or the like, as well as various combinations thereof). The TCP subflows of the MPTCP connection may be considered to be separate paths or connections for transporting respective portions of the traffic of the TCP connection and, thus, the MPTCP connection also may be considered to be composed of a set of paths or connections supporting transport of traffic of the TCP connection. The MPTCP controller 115 and the MPTCP controller 125 are configured to control the set of TCP subflows established and maintained for the MPTCP connection. The MPTCP proxies 116 and 126 include MPTCP schedulers 118 and 128, respectively, configured to control scheduling of traffic of the TCP flow onto the TCP subflows of the MPTCP connection. The operation of the various elements of the HCPE 110 and the HAG 120 may be further understood by considering specific directions of communication.

In the downstream direction, the MPTCP controller 125 on the HAG 120 or the MPTCP controller 115 on the HCPE 110 may control the set of TCP subflows established and maintained for the MPTCP connection (e.g., based on one or more TCP subflow establishment algorithms) and the MPTCP scheduler 128 of the MPTCP proxy 126 on the HAG 120 may control scheduling of traffic of the TCP connection onto the TCP subflows for transport to the HCPE 110 (e.g., based on one or more multipath scheduling algorithms), and the MPTCP proxy 116 on the HCPE 110 may control aggregation of traffic from the set of TCP subflows of the MPTCP connection to reconstruct the TCP flow of the TCP connection.

In the upstream direction, the MPTCP controller 115 on the HCPE 110 or the MPTCP controller 125 on the HAG 120 may control the set of TCP subflows established and maintained for the MPTCP connection (e.g., based on one or more TCP subflow establishment algorithms) and the MPTCP scheduler 118 of the MPTCP proxy 116 on the HCPE 110 may control scheduling of traffic of the TCP connection onto the TCP subflows for transport to the HAG 120 (e.g., based on one or more multipath scheduling algorithms), and the MPTCP proxy 126 on the HAG 120 may control aggregation of traffic from the set of TCP subflows of the MPTCP connection to reconstruct the TCP flow of the TCP connection.

The MPTCP controller 115 on the HCPE 110 and the MPTCP controller 125 on the HAG 120, as indicated above, may be configured to control the set of TCP subflows established and maintained for the MPTCP connection. The MPTCP controller 115 and the MPTCP controller 125 may be configured to control the set of TCP subflows of the MPTCP connection by controlling the access network(s) used for the TCP subflows of the MPTCP connection, controlling timing of establishment of the TCP subflows of the MPTCP connection (e.g., waiting for a predetermined length of time before establishing subsequent TCP subflows of the MPTCP connection in order to try to prevent race conditions for relatively short-lived TCP flows), controlling parameters of the TCP subflows of the MPTCP connection (e.g., data rate, latency constraints, or the like), or the like, as well as various combinations thereof). The MPTCP controller 115 and the MPTCP controller 125 may be configured to control the set of TCP subflows of the MPTCP connection based on one or more multipath path selection algorithms configured for use in controlling the set of TCP subflows maintained for the MPTCP connection. The MPTCP controller 115 on the HCPE 110 and the MPTCP controller 125 on the HAG 120 may be configured to support various other functions for controlling the set of TCP subflows established and maintained for the MPTCP connection.

The MPTCP scheduler 118 of the MPTCP proxy 116 on the HCPE 110 and the MPTCP scheduler 128 of the MPTCP proxy 126 on the HAG 120, as indicated above, may be configured to control scheduling of traffic of the TCP flow onto the TCP subflows of the MPTCP connection. The MPTCP scheduler 118 and the MPTCP scheduler 128 may be configured to control scheduling of traffic of the TCP flow onto the TCP subflows of the MPTCP connection using various scheduling techniques. For example, the MPTCP scheduler 118 and the MPTCP scheduler 128 may be configured to control scheduling of traffic of the TCP flow onto the TCP subflows of the MPTCP connection by making a TCP subflow decision for each packet of the TCP flow based on rules indicative that a packet of the TCP flow is only moved to a TCP subflow of the MPTCP connection if there is an empty slot within the TCP subflow (i.e., the TCP congestion window (CWIN) and advertised TCP receive window (RWIN) are not full) and, further, that in the case of bulk data transmission the CWINs of the TCP subflows may be filled and then subsequent packets of the TCP flow may be scheduled as space becomes available in the CWINs of the TCP subflows. It is noted that, after packets have been scheduled to TCP subflows by the MPTCP scheduler 118 and the MPTCP scheduler 128, forwarding rules may then be used to forward the packets to the appropriate egress interfaces. The MPTCP scheduler 118 and the MPTCP scheduler 128 may be configured to control scheduling of traffic of the TCP flow onto the TCP subflows of the MPTCP connection based on one or more multipath scheduling algorithms configured for use in controlling scheduling of traffic of the TCP flow onto the TCP subflows of the MPTCP connection. The MPTCP scheduler 118 and the MPTCP scheduler 128 may be configured to support various other functions for controlling scheduling of traffic of the TCP flow onto the TCP subflows of the MPTCP connection.

It will be appreciated that the HCPE 110 and the HAG 120 may be configured to support various other functions configured to support multipath communications.

The HAG 120 may be configured to support application-based traffic control for the TCP flow of the TCP connection. The HAG 120 may be configured to support application-based traffic control for the TCP flow of the TCP connection by determining an application indication of the traffic of the TCP flow of the TCP connection and performing traffic control for the TCP flow of the TCP connection based on the application indication of the traffic of the TCP flow of the TCP connection.

The HAG 120 may be configured to determine the application indication of the traffic of the TCP flow of the TCP connection for use in performing application-based traffic control for the traffic of the TCP flow of the TCP connection.

The application indication of the traffic of the TCP flow of the TCP connection may include an indication that the traffic of the TCP flow of the TCP connection is associated with an application, an indication that the traffic of the TCP flow of the TCP connection is associated with an application type, or the like, as well as various combinations thereof.

The application indication of the traffic of the TCP flow of the TCP connection may be determined based on header inspection, deep packet inspection (DPI), or the like, as well as various combinations thereof.

The application indication of the traffic of the TCP flow of the TCP connection may be determined based on various match conditions, at least some of which are discussed further below.

For example, the application or application type of the traffic of the TCP flow of the TCP connection may be determined based on a tuple, such as a 3-tuple (e.g., source IP address, destination IP address, and protocol), a 5-tuple (e.g., source IP address, source port, destination IP address, destination port, and protocol), or the like. This may be used, for example, where it is known that specific servers for specific applications or application types use specific IP addresses and ports.

For example, the application or application type of the traffic of the TCP flow of the TCP connection may be determined based on a protocol (e.g., Hypertext Transfer Protocol (HTTP), File Transfer Protocol (FTP), Session Initiation Protocol (SIP), or the like). The application or application type of the traffic of the TCP flow of the TCP connection may be determined based on the specific way in which the protocol is used. This may be used, for example, where it is known that specific applications or application types use specific protocols.

For example, the application or application type of the traffic of the TCP flow of the TCP connection may be determined based on identification of the application in the traffic transported by the TCP flow (e.g., an application name of the application, an application identifier of the application, behavior of the traffic, or the like). This may be used, for example, where an indication of the specific application of the traffic is explicitly included within the packets of the TCP flow, implicitly determined based on flow attributes of the TCP flow, or the like, as well as various combinations thereof.

For example, the application or application type of the traffic of the TCP flow of the TCP connection may be determined based on the application group with which the TCP flow is associated. It is noted that, once an application has been classified, it can be mapped by configured policy into an application group. This may be used, for example, where it is known that specific applications or application types are associated with specific application groups.

For example, the application or application type of the traffic of the TCP flow of the TCP connection may be determined based on the charging group with which the TCP flow is associated. It is noted that, once an application has been classified, it can be mapped by configured policy into an charging group. This may be used, for example, where it is known that specific applications or application types are associated with specific charging groups.

It will be appreciated that various combinations of such match conditions may be used to determine the application or application type of the traffic of the TCP flow of the TCP connection.

The HAG 120 may be configured to perform application-based traffic control for the traffic of the TCP flow of the TCP connection based on the application indication of the traffic of the TCP flow of the TCP connection. The application-based traffic control, as discussed further below, may include application-based traffic steering, application-based traffic blocking, or the like, as well as various combinations thereof.

The HAG 120 may be configured to perform application-based traffic steering for the traffic of the TCP flow of the TCP connection based on the application indication of the traffic of the TCP flow of the TCP connection. The application-based traffic steering may include controlling multipath scheduling that is applied by the MPTCP proxy 125 for scheduling packets of the TCP flow onto the TCP subflows of the MPTCP connection. The application-based traffic steering may include controlling the TCP subflows of the MPTCP connection that are used by the MPTCP proxy 125 to transport packets of the TCP flow based on factors such as RTTs of the TCP subflows (e.g., preferring TCP subflows having minimum RTT), costs of the TCP subflows (e.g., preferring TCP subflows having minimum cost), or the like, as well as various combinations thereof. The application-based traffic steering may include controlling the set of multipath scheduling algorithms that are used to schedule packets of the TCP flow onto the TCP subflows of the MPTCP connection (e.g., one or more multipath scheduling algorithms based on RTTs of the TCP subflows, one or more multipath scheduling algorithms based on costs of the TCP subflows, a round-robin multipath scheduling algorithm, or the like, as well as various combinations thereof). It is noted that the HAG 120 may be configured to support application-based traffic steering in the downstream direction.

In at least some example embodiments, a min-rtt-prefer multipath scheduling algorithm may be applied by the HAG 120 for the traffic of the TCP flow of the TCP connection, based on the application indication of the traffic of the TCP flow of the TCP connection, in order to support application-based traffic steering for the traffic of the TCP flow of the TCP connection. In the min-rtt-prefer multipath scheduling algorithm, if the TCP subflow CWINs of each of the TCP subflows have space available, then the TCP subflow with lowest RTT is preferred; otherwise, transmit on whichever TCP subflow has associated CWIN space available (assuming that there is room in the RWIN). The RTTs of the paths may be measured and updated in various ways (e.g., based on one measurement for each path where the measurements are performed periodically or responsive to conditions, based on multiple measurements for each path averaged over time (e.g., with each round-trip, every other round-trip, or the like) since the RTTs of the paths may change over time based on buffering and congestion, or the like, as well as various combinations thereof.

In at least some example embodiments, a min-rtt-handover multipath scheduling algorithm may be applied by the HAG 120 for the traffic of the TCP flow of the TCP connection, based on the application indication of the traffic of the TCP flow of the TCP connection, in order to support application-based traffic steering for the traffic of the TCP flow of the TCP connection. In the min-rtt-handover multipath scheduling algorithm, if the TCP window is available on each of the TCP subflows, only the TCP subflow with the lowest RTT is used. In the min-rtt-handover multipath scheduling algorithm, the multipath scheduler chooses the available TCP subflow with the lowest RTT and transmits when the TCP subflow CWIN of the available TCP subflow with the lowest RTT has space available (assuming that there is room in the RWIN). The min-rtt-handover multipath scheduling algorithm transmits using a single TCP subflow, supporting handover between TCP subflows to use the lowest cost TCP subflow. The min-rtt-handover multipath scheduling algorithm provides path handover for path protection based on cost and path availability. The RTTs of the paths may be measured and updated in various ways (e.g., based on one measurement for each path where the measurements are performed periodically or responsive to conditions, based on multiple measurements for each path averaged over time (e.g., with each round-trip, every other round-trip, or the like) since the RTTs of the paths may change over time based on buffering and congestion, or the like, as well as various combinations thereof.

In at least some example embodiments, a min-cost-prefer multipath scheduling algorithm may be applied by the HAG 120 for the traffic of the TCP flow of the TCP connection, based on the application indication of the traffic of the TCP flow of the TCP connection, in order to support application-based traffic steering for the traffic of the TCP flow of the TCP connection. In the min-cost-prefer multipath scheduling algorithm, if the TCP subflow CWINs on each of the TCP subflows have space available, then the TCP subflow with lowest administrative cost is preferred; otherwise, transmit on whichever TCP subflow has CWIN space available (assuming that there is room in the RWIN). It is noted that this behavior is similar to the min-rtt-prefer multipath scheduling algorithm, but allows larger RTT on preferred low-cost TCP subflows (e.g., satellite paths).

In at least some example embodiments, a min-cost-handover multipath scheduling algorithm may be applied by the HAG 120 for the traffic of the TCP flow of the TCP connection, based on the application indication of the traffic of the TCP flow of the TCP connection, in order to support application-based traffic steering for the traffic of the TCP flow of the TCP connection. In the min-cost-handover multipath scheduling algorithm, the multipath scheduler chooses the available TCP subflow with the lowest administrative cost and transmits when the TCP subflow CWIN of the lowest-cost TCP subflow has space available (assuming that there is room in the RWIN). The min-cost-handover multipath scheduling algorithm transmits using a single TCP subflow, supporting handover between TCP subflows to use the lowest cost TCP subflow. The min-cost-handover multipath scheduling algorithm provides path handover for path protection, based on cost and path availability.

In at least some example embodiments, a round-robin multipath scheduling algorithm may be applied by the HAG 120 for the traffic of the TCP flow of the TCP connection, based on the application indication of the traffic of the TCP flow of the TCP connection, in order to support application-based traffic steering for the traffic of the TCP flow of the TCP connection. In the round-robin multipath scheduling algorithm, if the TCP subflow CWINs on each of the TCP subflows have space available, then the next TCP subflow is selected (e.g., in the case of two TCP subflows, whichever one the prior packet was not scheduled on); otherwise, if only one of the TCP subflows has CWIN space available, transmit on that TCP subflow that has CWIN space available (assuming that there is room in the RWIN). It is noted that the round-robin multipath scheduling algorithm may or may not be a weighted round-robin multipath scheduling algorithm.

It will be appreciated that the HAG 120 may be configured to perform application-based traffic steering for the traffic of the TCP flow of the TCP connection based on use of various other multipath scheduling algorithms.

The HAG 120 may be configured to perform application-based traffic blocking for the traffic of the TCP flow of the TCP connection based on the application indication of the traffic of the TCP flow of the TCP connection. The application-based traffic blocking may include controlling the TCP subflows that are maintained by the MPTCP proxy 125 as part of the MPTCP connection for use in transporting packets of the TCP flow via the MPTCP connection. The application-based traffic blocking may include controlling the TCP subflows that are maintained by the MPTCP proxy 125 as part of the MPTCP connection based on use of TCP subflow establishment blocking, TCP subflow termination, or the like, as well as various combinations thereof. The application-based traffic blocking may include controlling the TCP subflows of the MPTCP connection that are used by the MPTCP proxy 125 to transport packets of the TCP flow based on factors such as costs of the TCP subflows (e.g., blocking TCP subflows having maximum cost), RTTs of the TCP subflows (e.g., blocking TCP subflows having maximum RTT), or the like, as well as various combinations thereof. The application-based traffic blocking may include controlling the set of multipath path selection algorithms that are used to control the set of TCP subflows maintained for the MPTCP connection (e.g., a blocking algorithm configured to block establishment of a TCP subflow for the MPTCP connection, a termination algorithm configured to initiate termination of a TCP subflow of the MPTCP connection, or the like, as well as various combinations thereof). It is noted that the HAG 120 may be configured to support application-based traffic blocking in the downstream direction (e.g., preventing establishment of TCP subflows for the MPTCP connection locally at the HAG 120, terminating existing TCP subflows of the MPTCP connection locally at the HAG 120, or the like) and in the upstream direction (e.g., denying a request by the MPTCP proxy 115 of the HCPE 110 for establishment of a particular TCP subflow for the MPTCP connection, forcing termination of a TCP subflow established by the MPTCP proxy 115 of the HCPE 110 to prevent use of that TCP subflow by the MPTCP proxy 115 of the HCPE 110 for the MPTCP connection, or the like). It is noted that, by supporting application-based traffic blocking in the upstream direction, the HAG 120 obviates the need for the HCPE 110 to be application-aware (and, thus, obviates the need for the HCPE 110 to support DPI and other related resource intensive operations which may be needed in order to provide application-based traffic control).

In at least some example embodiments, a max-cost-forbid multipath path selection algorithm may be applied by the HAG 120 for the MPTCP connection supporting the TCP flow of the TCP connection, based on the application indication of the traffic of the TCP flow of the TCP connection, in order to support application-based traffic blocking for the traffic of the TCP flow of the TCP connection. The max-cost-forbid multipath path selection algorithm may prevent establishment of a new TCP subflow for the MPTCP connection where the new TCP subflow has the highest administrative cost among the set of potential or existing TCP subflows for the MPTCP connection. The max-cost-forbid multipath path selection algorithm may initiate termination of an existing TCP subflow of the MPTCP connection where the existing TCP subflow has the highest administrative cost among the set of potential or existing TCP subflows for the MPTCP connection.

In at least some example embodiments, a max-rtt-forbid multipath path selection algorithm may be applied by the HAG 120 for the MPTCP connection supporting the TCP flow of the TCP connection, based on the application indication of the traffic of the TCP flow of the TCP connection, in order to support application-based traffic blocking for the traffic of the TCP flow of the TCP connection. The max-rtt-forbid multipath path selection algorithm may prevent establishment of a new TCP subflow for the MPTCP connection where the new TCP subflow has the highest RTT among the set of potential or existing TCP subflows for the MPTCP connection. The max-cost-forbid multipath path algorithm may initiate termination of an existing TCP subflow of the MPTCP connection where the existing TCP subflow has the highest RTT among the set of potential or existing TCP subflows for the MPTCP connection.

It will be appreciated that the HAG 120 may be configured to perform application-based traffic blocking for the traffic of the TCP flow of the TCP connection based on use of various other multipath path selection algorithms.

The HAG 120 may be configured to perform application-based traffic control for the traffic of the TCP flow of the TCP connection based on use of traffic control policies. In general, a traffic control policy may specify one or more multipath scheduling algorithms to be applied (e.g., min-rtt-prefer, min-rtt-handover, min-cost-prefer, min-cost-handover, round robin, or the like), one or more multipath path selection algorithms to be applied (e.g., max-cost-forbid, max-rtt-forbid, or the like), or the like, as well as various combinations thereof.

In at least some embodiments, application-based traffic control for the traffic of the TCP flow of the TCP connection based on use of traffic control policies may be configured to override default traffic control policies based on the application indication of the traffic.

In at least some embodiments, application-based traffic control for the traffic of the TCP flow of the TCP connection based on use of multipath scheduling policies may be configured to override default multipath scheduling policies based on application or application type. An MPTCP proxy instance can be configured with a default multipath scheduling policy (which may be composed of one or more multipath scheduling, one or more of which may be set as the default to be used) used for sessions on that MPTCP proxy instance and the default multipath scheduling policy can be overridden by policy rule control actions based on application or application type. This enables a mix of traffic control algorithms to be used at the same time on the same paths for a given subscriber (e.g., streaming video traffic can be min-cost-prefer and the remaining traffic (e.g., Web, mail, etc.) can be default min-cost-handover), ensures that policy changes of MPTCP schedulers take effect for new flows immediately or almost immediately, and application-aware scheduling can support various application-based traffic control match conditions (e.g., protocol, application, application group, charging group, or the like). The HAG 120 may support a list of exceptions affecting the configured multipath scheduling policy, on a per-subscriber, per-application, or filter policy basis. The exceptions may be configurable via provisioned rules, and associated to subscribers by policy. The subscriber traffic that matches the rules will only use the specified access type. It is noted that DPI-classification-based application awareness can also be used to decide which traffic should use which link (e.g., certain app-groups may only use the primary (fixed) link when both links are up, or then use the secondary only if the primary fails, or never use the secondary (block if primary down), and this decision will override the configured default path scheduling algorithm, according to configurable match+action policy rules. It is further noted that override match conditions may specify a multipath scheduling algorithm so that various use cases may be implemented (e.g., min-cost-handover may use the higher cost path only if the lower cost path is not available (e.g., this may be used where TCP session resilience is the main use case), min-cost-prefer may enable active/active path use for bandwidth aggregation while also using both paths for some high-value traffic, and so forth). It is further noted that the application QoS policy (AQP) action conditions can include a per-application policer to rate limit the amount of per-subscriber application or application type traffic across the paths of the MPTCP connection.

An example of a configuration approach for overriding a default traffic control scheduling policy based on application follows:

```
app-assure>group>policy>app-filter>
    entry 1 create
        protocol eq "skype"
        application "Skype"
configure>application-assurance>group>policy>aqp>
    entry 2 create
        match application eq "Skype"
        action mptcp-scheduler-policy {min-cost-prefer | min-rtt-prefer | min-cost-
handover, min-rtt-handover}
```

An example of a configuration approach for overriding a default MPTCP scheduling policy, using an access control list (ACL) filter rule, based on application follows:

```
configure>application-assurance>group>policy>aqp>
    entry 1 create
        match dst-ip <>
        match src-ip <>
        match src-port <>
        match dst-port <>
        match ip-protocol-num eq tcp
        action mptcp-scheduler-policy {min-cost-prefer | min-rtt-prefer | min-cost-
handover, min-rtt-handover}
```

In at least some embodiments, application-based traffic control for the traffic of the TCP flow of the TCP connection based on use of multipath path selection policies may be configured to override default multipath path selection policies based on application or application type. An MPTCP proxy instance can be configured with a default multipath path selection policy (which may be composed of one or more multipath path selection algorithms, one or more of which may be set as the default to be used) used for sessions on that MPTCP proxy instance and the default multipath path selection policy can be overridden by policy rule control actions based on application or application type. It is noted that application-aware DPI flow classification on the primary path may be used to prevent MPTCP path/TCP subflow establishment on the secondary path for any upstream or downstream traffic such that the traffic is prevented from using that MPTCP path/TCP subflow. It is noted that, since application-aware DPI flow classification typically classifies the TCP connection before the second TCP subflow is established, it can have the option to prevent (block) the subsequent TCP subflow (e.g., LTE, satellite, or the like) from being connected for applications or application types that are forbidden on that path. This provides additional control that allows application-aware flow classification in the HAG 120 to control upstream traffic path use, without requiring DPI in the HCPE, and also to prevent downstream use. It is further noted that an AQP match and action can be set to refer to use of mptcp-scheduler-policy="max-cost-forbid" such that there is only a single subflow (on the primary path). It is further noted that, although primarily described with respect to use of application-aware DPI flow classification to prevent the subsequent TCP subflow from being connected for applications or application types that are forbidden on that path, application-aware DPI flow classification also may be used to terminate an existing TCP subflow that was previously established for the MPTCP connection, thereby blocking further use of that TCP subflow for traffic of the TCP flow. It is further noted that override match conditions may specify a multipath path selection algorithm so that various use cases may be implemented (e.g., max-cost-forbid may prevent use of the higher cost path for low value applications or application types (e.g., when there is no willingness or ability to pay for the higher cost path), max-rtt-forbid, and so forth). It is further noted that the AQP action conditions can include a per-application policer to rate limit the amount of per-subscriber application or application type traffic across the paths of the MPTCP connection.

An example of a configuration approach for overriding a default multipath path selection policy (where the multipath path selection policy is implemented as an MPTCP scheduling policy) based on application follows:

```
app-assure>group>policy>app-filter>
    entry 1 create
        protocol eq "skype"
        application "Skype"
configure>application-assurance>group>policy>aqp>
    entry 2 create
        match application eq "Skype"
        action mptcp-scheduler-policy max-cost-forbid
        match ip-protocol-num eq tcp
        action mptcp-scheduler-policy max-cost-forbid
```

In at least some embodiments, application-based traffic control for the traffic of the TCP flow of the TCP connection based on use of policies may be configured to support explicit definition of traffic control policies based on application or application type such that the traffic control policies for the applications or application types, respectively, may be applied for controlling the traffic of the TCP flow of the TCP connection without use of default policies.

It will be appreciated that the HAG 120 may be configured to perform application-based traffic control for the traffic of the TCP flow of the TCP connection based on use of various combinations of such policy-based traffic control schemes (e.g., overriding of default traffic control policies, explicit definition of application-based traffic control policies, or the like, as well as various combinations thereof.

It will be appreciated that the HAG 120 may be configured to support various other functions for performing application-based traffic control for the traffic of the TCP flow of the TCP connection.

Figure 2:
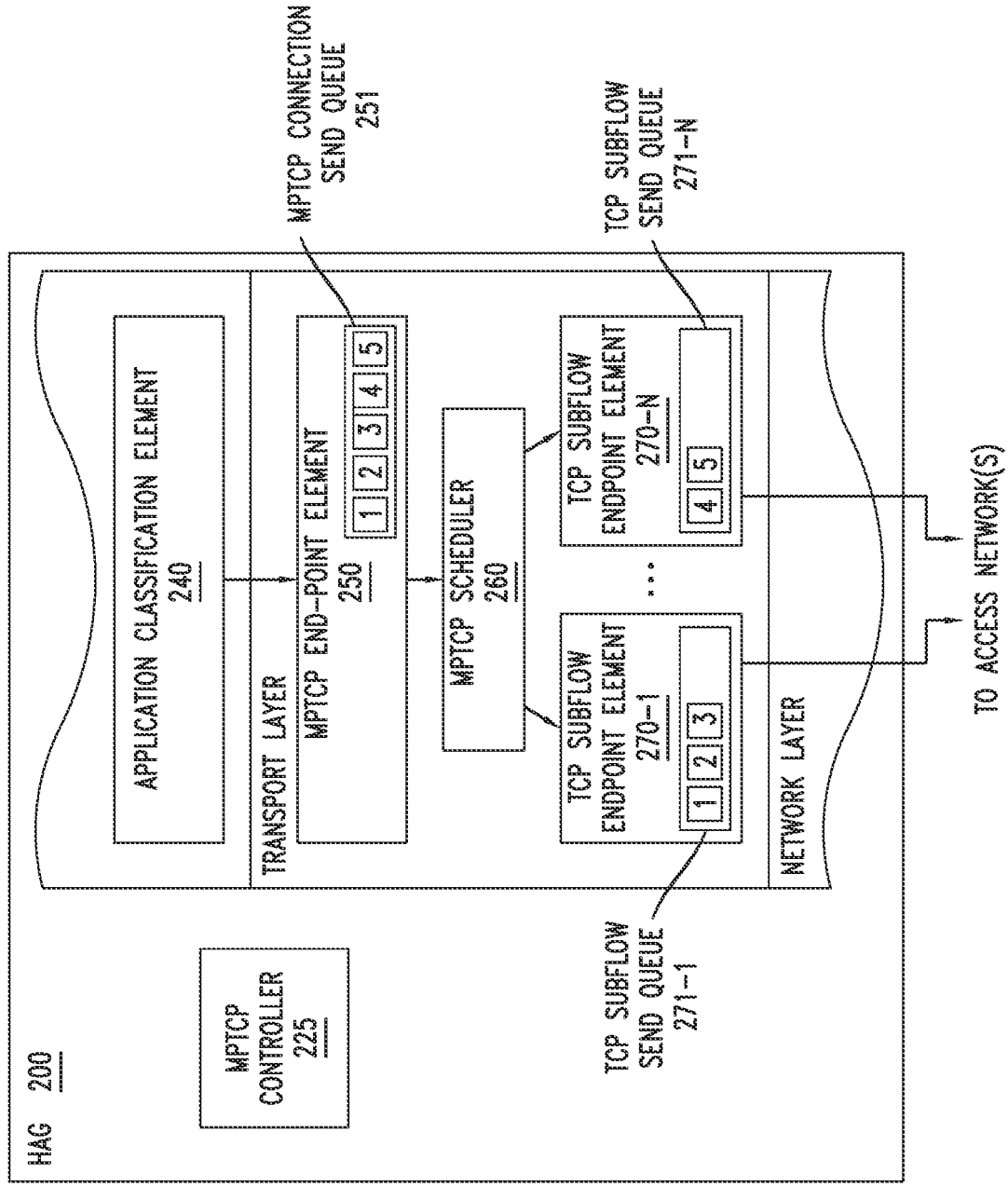
FIG. 2 depicts an example embodiment of a HAG configured to support application-based traffic control, including application-based traffic steering and application-based traffic blocking, in a multipath network.

FIG. 2 depicts an example embodiment of a HAG configured to support application-based traffic control, including application-based traffic steering and application-based traffic blocking, in a multipath network.

The HAG 200 configured to support application-based traffic control in a multipath network. The HAG 200 may be suitable for use as HAG 120 of FIG. 1.

The HAG 200 includes an MPTCP controller 225, an application classification element 240 that is configured to operate above the transport layer of the communication stack of the HAG 200, and an MPTCP proxy 226 that is configured to operate at the transport layer of the communication stack of the HAG 200. The application classification element 240 is configured to determine the application indication of traffic transported by a TCP connection that is transported by the MPTCP proxy 226 using multipath communications. The MPTCP controller 225 and the MPTCP proxy 226 may cooperate in order to support an MPTCP connection at the HAG 200 (e.g., to an HCPE, which is omitted for purpose of clarity). The MPTCP controller 225 is configured to control the set of TCP subflows established and maintained for the MPTCP connection. The MPTCP proxy 226 is configured to support communications of a TCP connection using the MPTCP connection. The MPTCP proxy 226 includes an MPTCP endpoint element 250 including an MPTCP connection send queue 251, an MPTCP scheduler 260, and a set of TCP subflow endpoint elements 270-1 to 270-N including TCP subflow send queues 271-1 to 271-N, respectively.

The HAG 200 may be configured to support transport of a TCP connection using multipath communications as follows. The application classification element 240 analyzes packets of the TCP connection to determine the application indication of traffic transported by a TCP connection. The packets of the TCP connection are queued in the MPTCP connection send queue 251 of the MPTCP endpoint element 250 while awaiting transmission via the TCP subflows of the MPTCP connection and also while awaiting receipt of associated acknowledgements from the HCPE. The MPTCP scheduler 260 schedules the packets of the TCP connection for transmission via the TCP subflows. The MPTCP scheduler 260 provides the packets from the MPTCP endpoint element 250 to the TCP subflow endpoint elements 270-1 to 270-N, for transmission via the associated TCP subflows, based on the scheduling of the packets of the TCP connection for transmission via the TCP subflows. The MPTCP scheduler 260 is configured to support application-based traffic steering by controlling scheduling of traffic of the TCP flow onto the TCP subflows of the MPTCP connection. The MPTCP controller 225 is configured to support application-based traffic blocking by controlling the set of TCP subflows of the MPTCP connection.

It will be appreciated that HAG 200, although primarily presented as having a particular configuration (e.g., specific types, numbers, and arrangements of elements), may be configured in various other ways for supporting application-based traffic control in a multipath network.

Figure 3:
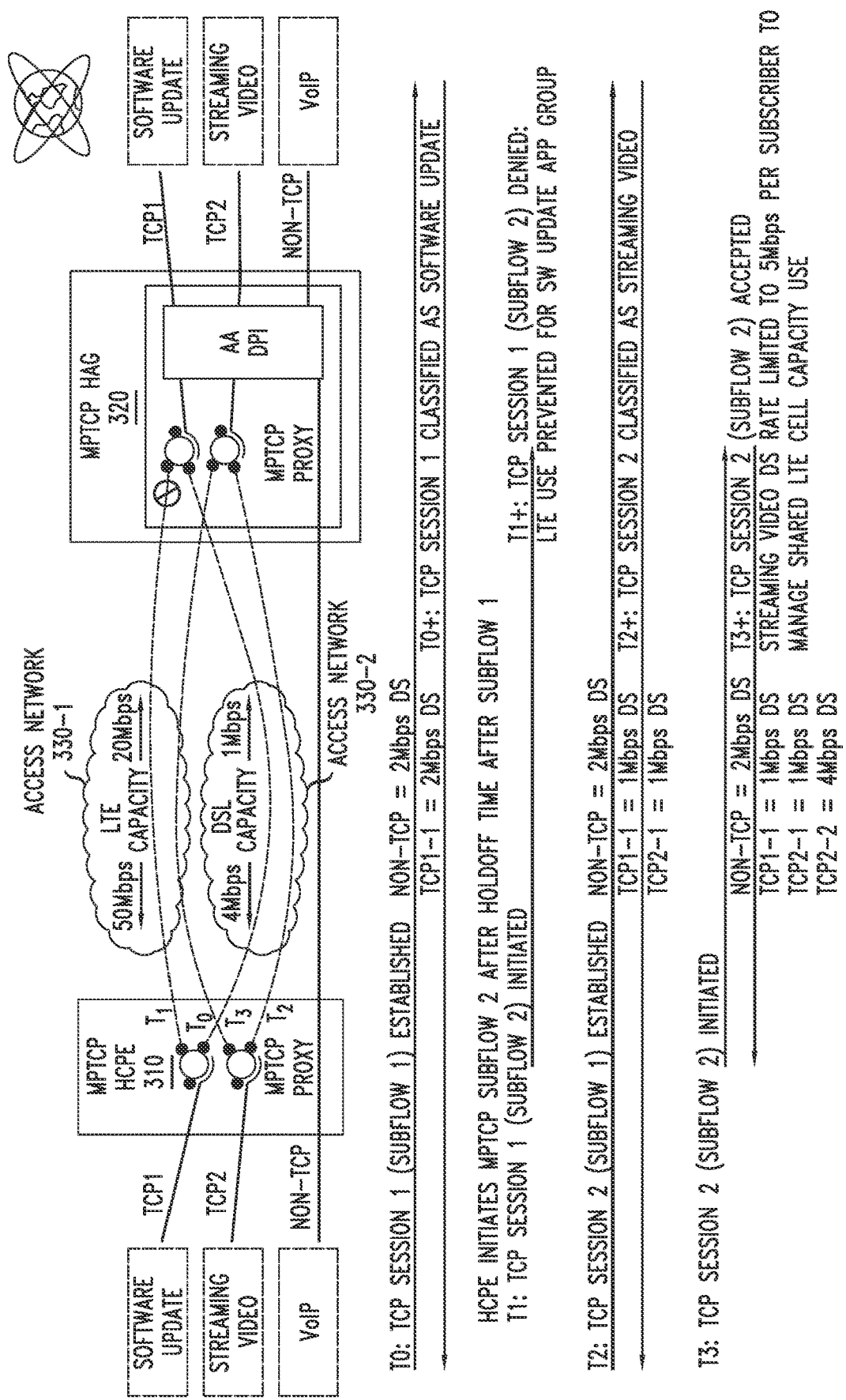
FIG. 3 depicts an example embodiment of a hybrid access communication system configured to support application-based traffic blocking in the downstream direction from the HAG toward the HCPE.

FIG. 3 depicts an example embodiment of a hybrid access communication system configured to support application-based traffic blocking in the downstream (DS) direction from the HAG toward the HCPE.

The hybrid access communication system 300 includes an MPTCP HCPE 310 (which may be configured similar to HCPE 110 of FIG. 1) and an MPTCP HAG 320 (which may be configured similar to HAG 120 of FIG. 1). The MPTCP HCPE 310 and the MPTCP HAG 320 support two pairs of MPTCP proxies including a first pair of MPTCP proxies supporting a first TCP connection (denoted as TCP1) for a software update application indication and a second pair of MPTCP proxies supporting a second TCP connection (denoted as TCP2) for a video streaming application indication. The MPTCP HCPE 310 and the MPTCP HAG 320 also support a non-TCP connection for a VoIP application indication. The MPTCP proxies of the MPTCP HCPE 310 and the MPTCP HAG 320 each support communication via a pair of access networks 330-1 (an LTE network configured to support specific downstream and upstream rates) and 330-2 (a DSL network configured to support specific downstream and upstream rates) which may be referred to collectively as access networks 330. The MPTCP HCPE 310 and the MPTCP HAG 320, as discussed further below, are configured to use multipath communications to support the first TCP connection and the second TCP connection.

The MPTCP HCPE 310 and the MPTCP HAG 320 are configured to use multipath communications to support the first TCP connection and the second TCP connection.

The MPTCP HCPE 310 and the MPTCP HAG 320, as indicated above, are configured to use multipath communications to support the first TCP connection. At time T0, TCP session 1 (TCP subflow 1) is established between the first pair of MPTCP proxies supporting the first TCP connection (denoted as TCP1) for the software update application indication over the DSL network (supporting 2 Mbps downstream), thereby providing an MPTCP connection for the first TCP connection. At time T0+ (sometime after T0), MPTCP HAG 320 classifies the first TCP connection (TCP session 1) as being for a software update application indication. At time T1, after a hold-off time used to prevent race conditions and ensure that the first TCP connection will be a relatively long-lived connection, MPTCP HCPE 310 initiates establishment of an additional TCP subflow for the first TCP connection (denoted as TCP session 1 (TCP subflow 2)). At time T1+ (sometime after T1), the MPTCP HAG 320 denies establishment of TCP session 1 (TCP subflow 2) over the LTE network for the first TCP connection based on the determination that the first TCP connection (TCP session 1) is being used for a software update application indication.

The MPTCP HCPE 310 and the MPTCP HAG 320, as indicated above, are configured to use multipath communications to support the second TCP connection. At time T2, TCP session 2 (TCP subflow 1) is established between the second pair of MPTCP proxies supporting the second TCP connection (denoted as TCP2) for the video streaming application indication over the LTE network (supporting 1 Mbps downstream), thereby providing an MPTCP connection for the second TCP connection. At time T2+ (sometime after T2), MPTCP HAG 320 classifies the first TCP connection (TCP session 1) as being for a video streaming application indication. At time T3, after a hold-off time used to prevent race conditions and ensure that the second TCP connection will be a relatively long-lived connection, MPTCP HCPE 310 initiates establishment of an additional TCP subflow for the first TCP connection (denoted as TCP session 2 (TCP subflow 2)). At time T3+ (sometime after T3), the MPTCP HAG 320 accepts establishment of TCP session 2 (TCP subflow 2) over the DSL network (supporting 4 Mbps downstream) for the second TCP connection, thereby providing an additional TCP subflow for the MPTCP connection for the second TCP connection, based on the determination that the second TCP connection (TCP session 2) is being used for a video streaming application indication. The MPTCP HAG 320 applies downstream rate limiting to the video streaming application indication (each subscriber is rate limited to 5 Mbps in the downstream direction (in this example, a combination of 1 Mbps downstream on TCP 1-1 and 4 Mbps downstream on TCP 2-2) in order to manage shared LTE cell capacity per use).

It will be appreciated that, although primarily presented with respect to specific numbers, types, and arrangements of elements (e.g., access networks 330, MPTCP proxies, TCP connections supported, and so forth), hybrid access communication system 300 may use various other numbers, types, or arrangements of elements.

Figure 4:
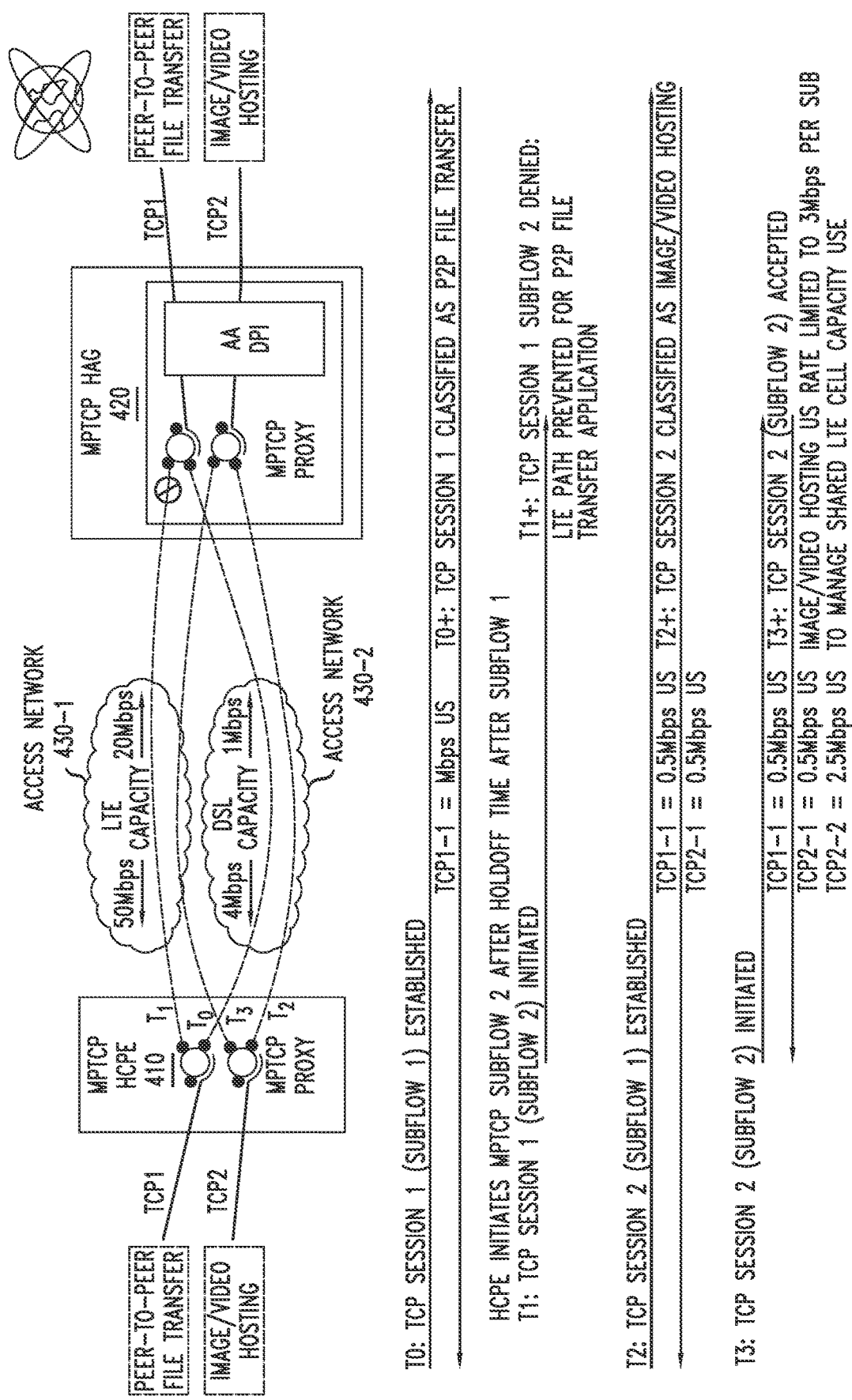
FIG. 4 depicts an example embodiment of a hybrid access communication system configured to support application-based traffic blocking in the upstream direction from the HCPE toward the HAG.

FIG. 4 depicts an example embodiment of a hybrid access communication system configured to support application-based traffic blocking in the upstream (US) direction from the HCPE toward the HAG.

The hybrid access communication system 400 includes an MPTCP HCPE 410 (which may be configured similar to HCPE 110 of FIG. 1) and an MPTCP HAG 420 (which may be configured similar to HAG 120 of FIG. 1). The MPTCP HCPE 410 and the MPTCP HAG 420 support two pairs of MPTCP proxies including a first pair of MPTCP proxies supporting a first TCP connection (denoted as TCP1) for a peer-to-peer file transfer application indication and a second pair of MPTCP proxies supporting a second TCP connection (denoted as TCP2) for an image/video hosting application indication. The MPTCP proxies of the MPTCP HCPE 410 and the MPTCP HAG 420 each support communication via a pair of access networks 430-1 (an LTE network configured to support specific downstream and upstream rates) and 430-2 (a DSL network configured to support specific downstream and upstream rates) which may be referred to collectively as access networks 430. The MPTCP HCPE 410 and the MPTCP HAG 420, as discussed further below, are configured to use multipath communications to support the first TCP connection and the second TCP connection.

The MPTCP HCPE 410 and the MPTCP HAG 420 are configured to use multipath communications to support the first TCP connection and the second TCP connection.

The MPTCP HCPE 410 and the MPTCP HAG 420, as indicated above, are configured to use multipath communications to support the first TCP connection. At time T0, TCP session 1 (TCP subflow 1) is established between the first pair of MPTCP proxies supporting the first TCP connection (denoted as TCP1) for the peer-to-peer file transfer application indication over the DSL network (supporting 1 Mbps upstream), thereby providing an MPTCP connection for the first TCP connection. At time T0+ (sometime after T0), MPTCP HAG 420 classifies the first TCP connection (TCP session 1) as being for a peer-to-peer file transfer application indication. At time T1, after a hold-off time used to prevent race conditions and ensure that the first TCP connection will be a relatively long-lived connection, MPTCP HCPE 410 initiates establishment of an additional TCP subflow for the first TCP connection (denoted as TCP session 1 (TCP subflow 2)). At time T1+ (sometime after T1), the MPTCP HAG 420 denies establishment of TCP session 1 (TCP subflow 2) over the LTE network for the first TCP connection based on the determination that the first TCP connection (TCP session 1) is being used for a peer-to-peer file transfer application indication.

The MPTCP HCPE 410 and the MPTCP HAG 420, as indicated above, are configured to use multipath communications to support the second TCP connection. At time T2, TCP session 2 (TCP subflow 1) is established between the second pair of MPTCP proxies supporting the second TCP connection (denoted as TCP2) for the image/video hosting application indication over the LTE network (supporting 0.5 Mbps upstream), thereby providing an MPTCP connection for the second TCP connection. At time T2+ (sometime after T2), MPTCP HAG 420 classifies the first TCP connection (TCP session 1) as being for an image/video hosting application indication. At time T3, after a hold-off time used to prevent race conditions and ensure that the second TCP connection will be a relatively long-lived connection, MPTCP HCPE 410 initiates establishment of an additional TCP subflow for the first TCP connection (denoted as TCP session 2 (TCP subflow 2)). At time T3+ (sometime after T3), the MPTCP HAG 420 accepts establishment of TCP session 2 (TCP subflow 2) over the DSL network (supporting 2.5 Mbps upstream) for the second TCP connection, thereby providing an additional TCP subflow for the MPTCP connection for the second TCP connection, based on the determination that the second TCP connection (TCP session 2) is being used for an image/video hosting application indication. The MPTCP HAG 420 applies upstream rate limiting to the image/video hosting application indication (each subscriber is rate limited to 3 Mbps in the upstream direction (in this example, a combination of 0.5 Mbps upstream on TCP 1-1 and 2.5 Mbps upstream on TCP 2-2) in order to manage shared LTE cell capacity per use).

It will be appreciated that, although primarily presented with respect to specific numbers, types, and arrangements of elements (e.g., access networks 430, MPTCP proxies, TCP connections supported, and so forth), hybrid access communication system 400 may use various other numbers, types, or arrangements of elements.

It will be appreciated that, although primarily presented herein within the context of providing embodiments of application-based traffic control for a specific type of multipath communication (namely, MPTCP) in a specific type of communication network (namely, a hybrid access communication network) for specific types of devices (namely, for multipath communications between a HAG and an HCPE), embodiments of application-based traffic control may be provided for various other types of multipath communications, various other types of communication networks, between various other types of devices (e.g., a wireless end device and a wireless network gateway, a wireless end device and a network gateway, or the like), or the like, as well as various combinations thereof. Accordingly, various terms used herein may be referred to more generally.

Figure 5:
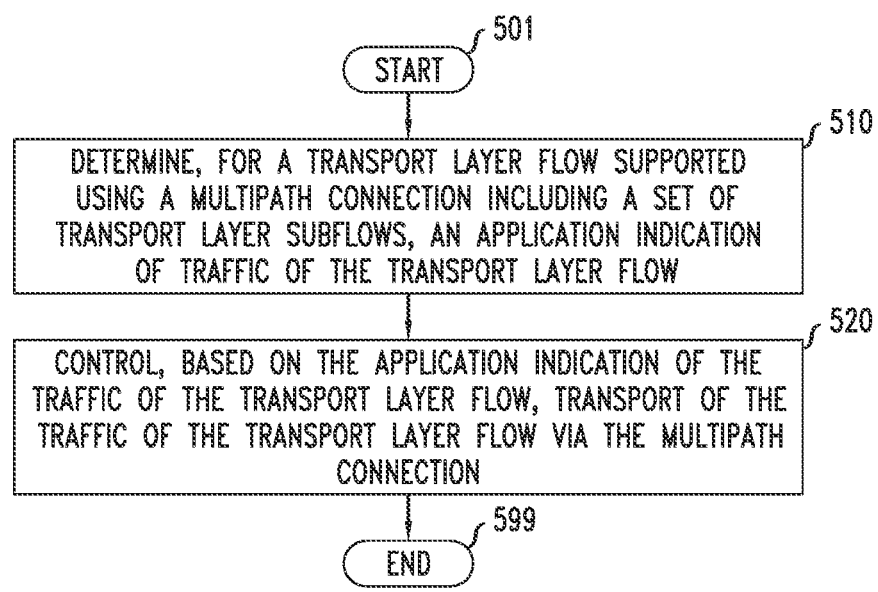
FIG. 5 depicts an example embodiment of a method for use by a device to support application-based traffic control for a multipath connection supporting a transport layer flow of a transport connection.

FIG. 5 depicts an example embodiment of a method for use by a device to support application-based traffic control for a multipath connection supporting a transport layer flow of a transport connection. It will be appreciated that, although primarily presented herein as being performed serially, at least a portion of the functions of method 500 may be performed contemporaneously or in a different order than as presented in FIG. 5. At block 501, method 500 begins. At block 510, determine, for a transport layer flow supported using a multipath connection including a set of transport layer subflows, an application indication of traffic of the transport layer flow. At block 520, control, based on the application indication of the traffic of the transport layer flow, transport of the traffic of the transport layer flow via the multipath connection. At block 599, method 500 ends.

Various example embodiments for supporting application-based traffic control in a multipath network may provide various advantages or potential advantages. For example, various example embodiments for supporting application-based traffic control in a multipath network may support combining application or application type classification with controlling whether traffic may use specific multipath paths (e.g., in terms of controlling scheduling of packets on existing paths of the multipath connection, controlling selection and establishment of paths that form part of the multipath connection, or the like, as well as various combinations thereof). For example, various example embodiments for supporting application-based traffic control in a multipath network may support application-based traffic control based on application or application type in a manner allowing traffic engineering (e.g., multipath scheduling (including, but not limited to, the cost of the paths and the path types of the paths), multipath path selection, or the like) based on the application or type of application that is using MPTCP. For example, various example embodiments for supporting application-based traffic control in a multipath network may support application-based traffic steering over MPTCP for cost and value based load-sharing across multiple network paths. For example, various example embodiments for supporting application-based traffic control in a multipath network may support application-based traffic path restrictions over MPTCP. Various example embodiments for supporting application-based traffic control in a multipath network may provide various other advantages or potential advantages.

Figure 6:
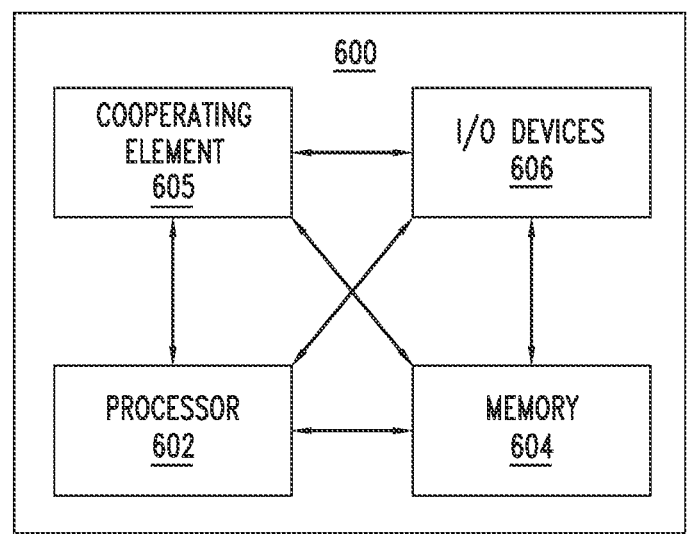
FIG. 6 depicts a high-level block diagram of a computer suitable for use in performing various functions presented herein.

FIG. 6 depicts a high-level block diagram of a computer suitable for use in performing various functions described herein.

The computer 600 includes a processor 602 (e.g., a central processing unit (CPU), a processor having a set of processor cores, a processor core of a processor, or the like) and a memory 604 (e.g., a random access memory (RAM), a read only memory (ROM), or the like). The processor 602 and the memory 604 may be communicatively connected.

The computer 600 also may include a cooperating element 605. The cooperating element 605 may be a hardware device configured implement various functions as presented herein. The cooperating element 605 may be a process that can be loaded into the memory 604 and executed by the processor 602 to implement various functions as presented herein (in which case, for example, the cooperating element 605 (including associated data structures) can be stored on a non-transitory computer-readable storage medium, such as a storage device or other storage element (e.g., a magnetic drive, an optical drive, or the like)).

The computer 600 also may include one or more input/output devices 606. The input/output devices 606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 600 of FIG. 6 may represent a general architecture and functionality suitable for implementing functional elements presented herein, portions of functional elements presented herein, or the like, as well as various combinations thereof. For example, computer 600 may provide a general architecture and functionality that is suitable for implementing one or more elements presented herein, such as HCPE 110 or a portion thereof, MPTCP controller 111 or a portion thereof, MPTCP proxy 115 or a portion thereof, HAG 120 or a portion thereof, MPTCP controller 121 or a portion thereof, MPTCP proxy 125 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    at least one processor; and
    at least one memory including instructions which, when executed by the at least one processor, cause the apparatus to at least:
        support, by a hybrid access device, establishment of a first transport layer subflow for a transport layer flow of a multipath connection;
        determine, by the hybrid access device based on the first transport layer subflow, an application indication of traffic of the transport layer flow;
        detect, by the hybrid access device, a request for establishment of a second transport layer subflow for the transport layer flow of the multipath connection; and
        determine, by the hybrid access device based on the application indication, whether to establish the second transport layer subflow for the transport layer flow of the multipath connection.

2. The apparatus of claim 1, wherein the application indication includes at least one of an indication of an application of the traffic of the transport layer flow or an indication of an application type of the traffic of the transport layer flow.

3. The apparatus of claim 1, wherein the request for establishment of the second transport layer subflow for the transport layer flow of the multipath connection is received from a second hybrid access device associated with the multipath connection.

4. The apparatus of claim 1, wherein the instructions, when executed by the at least one processor, cause the apparatus to at least:
    permit, by the hybrid access device based on the application indication, establishment of the second transport layer subflow for the transport layer flow of the multipath connection.

5. The apparatus of claim 1, wherein the instructions, when executed by the at least one processor, cause the apparatus to at least:
    prevent, by the hybrid access device based on the application indication, establishment of the second transport layer subflow for the transport layer flow of the multipath connection.

6. The apparatus of claim 1, wherein the first transport layer subflow is associated with a wireline network and the second transport layer subflow is associated with a wireless network.

7. The apparatus of claim 1, wherein the first transport layer subflow is associated with a wireless network and the second transport layer subflow is associated with a wireline network.

8. The apparatus of claim 1, wherein the hybrid access device is a hybrid access gateway or a hybrid access customer premises equipment.

9. The apparatus of claim 1, wherein the multipath connection comprises a Multipath-Transmission Control Protocol (MP-TCP) connection.

10. A method, comprising:
    supporting, by a hybrid access device, establishment of a first transport layer subflow for a transport layer flow of a multipath connection;
    determining, by the hybrid access device based on the first transport layer subflow, an application indication of traffic of the transport layer flow;
    detecting, by the hybrid access device, a request for establishment of a second transport layer subflow for the transport layer flow of the multipath connection; and
    determining, by the hybrid access device based on the application indication, whether to establish the second transport layer subflow for the transport layer flow of the multipath connection.

11. The method of claim 10, wherein the application indication includes at least one of an indication of an application of the traffic of the transport layer flow or an indication of an application type of the traffic of the transport layer flow.

12. The method of claim 10, wherein the request for establishment of the second transport layer subflow for the transport layer flow of the multipath connection is received from a second hybrid access device associated with the multipath connection.

13. The method of claim 10, further comprising:
    permitting, by the hybrid access device based on the application indication, establishment of the second transport layer subflow for the transport layer flow of the multipath connection.

14. The method of claim 10, further comprising:
preventing, by the hybrid access device based on the application indication, establishment of the second transport layer subflow for the transport layer flow of the multipath connection.

15. The method of claim 10, wherein the first transport layer subflow is associated with a wireline network and the second transport layer subflow is associated with a wireless network.

16. The method of claim 10, wherein the first transport layer subflow is associated with a wireless network and the second transport layer subflow is associated with a wireline network.

17. The method of claim 10, wherein the hybrid access device is a hybrid access gateway or a hybrid access customer premises equipment.

18. The method of claim 10, wherein the multipath connection comprises a Multipath-Transmission Control Protocol (MP-TCP) connection.

* * * * *